United States Patent [19]
Zaugg

[11] 3,745,763
[45] July 17, 1973

[54] FINE-ADJUSTMENT DEVICE FOR WATCH-MOVEMENT REGULATOR-ASSEMBLY

[75] Inventor: Roland Zaugg, Grenchen, Switzerland

[73] Assignee: A. Schild S.A., Grenchen (Canton of Soleure), Switzerland

[22] Filed: July 7, 1972

[21] Appl. No.: 269,543

[52] U.S. Cl. ............................................. 58/109
[51] Int. Cl. ............................................ G04b 17/14
[58] Field of Search ............................... 58/109–115

[56] References Cited
UNITED STATES PATENTS
| | | | |
|---|---|---|---|
| 3,306,026 | 2/1967 | Kocher | 58/109 |
| 3,442,074 | 5/1969 | Ringger | 58/109 |
| 3,540,210 | 11/1970 | Saito et al. | 58/109 |

FOREIGN PATENTS OR APPLICATIONS
| | | | |
|---|---|---|---|
| 338,769 | 7/1959 | Switzerland | 58/109 |
| 468,032 | 3/1969 | Switzerland | 58/109 |

*Primary Examiner*—George H. Miller, Jr.
*Attorney*—Richard K. Stevens, Davidson C. Miller et al.

[57] ABSTRACT

A fine-adjustment device for watch-movement regulator-assemblies, comprising a control organ pivoting on a balance-cock and provided with an eccentric functioning together with a regulator-tail; wherein the control organ comprises a finger-piece extending towards the regulator axis within a cut-out which is laterally open on one of the sides of the regulator-tail, that the regulator tail is provided with a hub located on a fixed component fastened to the cock and compressed by an adjustable regulator ring surrounding the hub and located at the same level as the control organ, this ring being provided with an arm supporting regulator pin and key or balance-spring boot.

5 Claims, 2 Drawing Figures

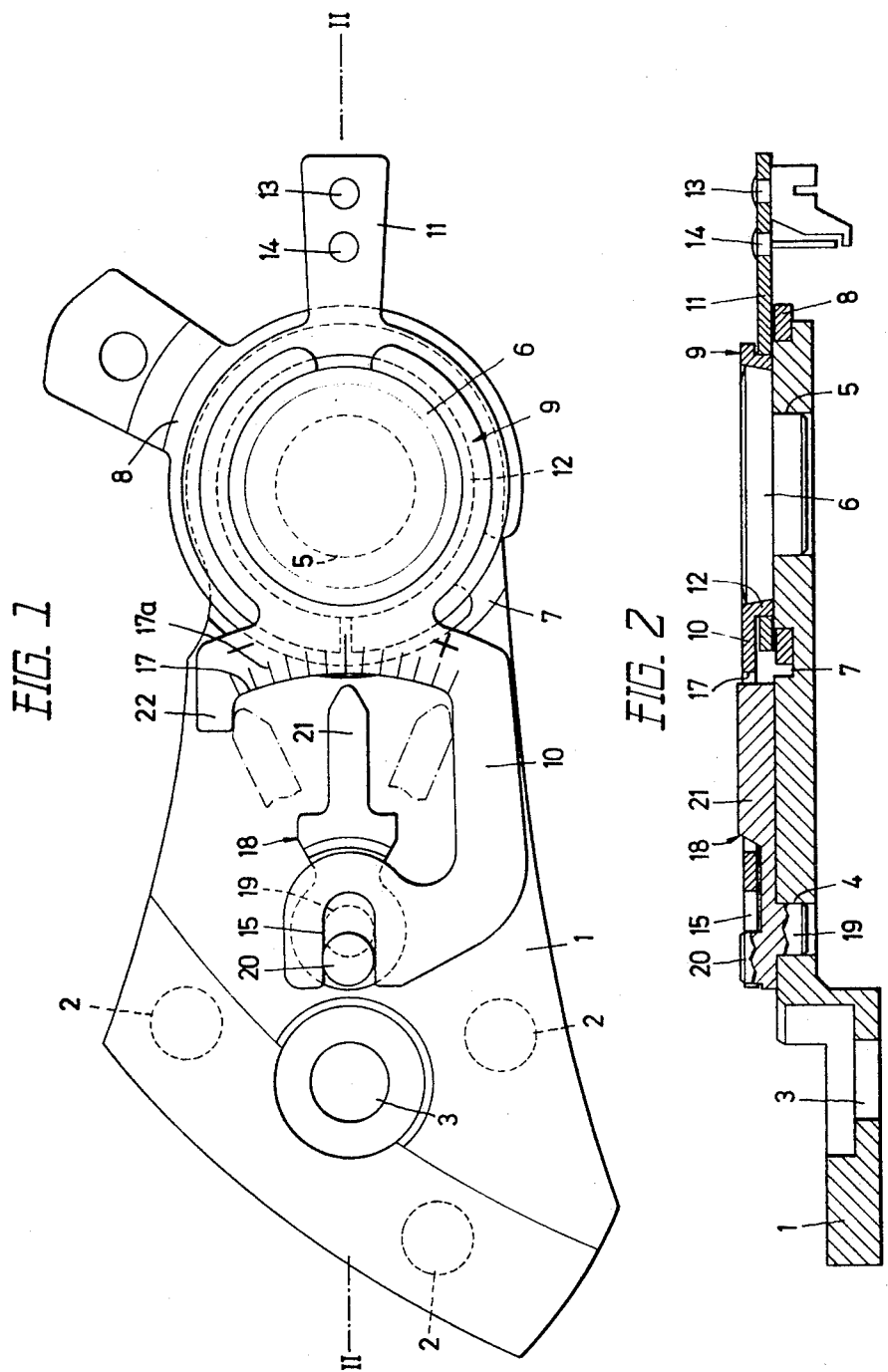

FINE-ADJUSTMENT DEVICE FOR WATCH-MOVEMENT REGULATOR-ASSEMBLY

The object of the present invention is a fine-adjustment device for a watch-movement regulator-assembly, comprising a control organ pivoting on the balance-cock and provided with an eccentric that works in concert with the regulator tail.

Fine-adjustment devices for regulator-assemblies are being used in mechanical watch movements which are so built as to offer very high constancy. The movement rate, that is, the difference between the actual speed of rotation of the hands and the speed corresponding to the precise time is therefore very constant and one may, this being desirable, adjust the active length of the balance-spring to such a value that this rate be very nearly zero. Fine-adjustment devices for regulator-assemblies are meant to easily allow such adjustment on the part of a watch-repairer.

However, it is also desirable that the components of the fine-adjustment device be as easy to manufacture as possible, that their assembly be simple and the device of small size. Further, devices are known at present that may automatically activate a movable organ which controlling the watch's oscillating frequency system, such devices therefore automatically adjusting the regulator, and it is desirable to achieve a fine-adjustment device satisfying the conditions listed above and that may be activated by known automatic adjustment arrangements.

Generally the control organ of the fine-adjustment devices that may be used in watches is located between the two arms of the regulator tail, and the regulator extends very near the cock's planche or plate. In certain known embodiments, the balance-cock's planche is provided with a hollow partly located underneath the end of the regulator tail, so that the control organ housed in this hollow is partly covered by the two arms of the regulator's tail.

In general, the regulator is made up of two parts, the tail and the regulator proper, which may be adjusted with respect to one another in order to obtain a preliminary and coarse adjustment. During fine-adjustment, the control organ is rotated so that its eccentric causes joint rotation of tail and regulator proper. In some of those known devices, the two regulator components and the control organ are held in place by a movable hair-spring stud support which covers them and provides regulator rotation. Such an arrangement entails three coaxial pivoting surfaces, the plays of which add up and thus increase lack of precision in the mechanism. Further, as the regulator tail is connected to the hair-spring support by the eccentric's pivoting peg, any hair-spring support displacement also entails a regulator-tail displacement. Further, in order to allow controlling very small regulator tail motions by means of the eccentric, the latter must be provided with a relatively long arm extending beyond the eccentric and away from the center of the regulator-assembly, thus increasing the size of the device. The eccentric not pivoting on the balance-cock also constitutes a drawback when an automatic adjusting device is used.

Therefore the goal of the present invention is to remedy these various drawbacks of the known fine-adjustment devices for regulator-assemblies, and hence the device according to the invention and of the kind mentioned initially is thus characterized that the control organ comprises a finger extending towards the regulator axis within a cut-out that opens laterally towards one of the tail sides, and that the regulator tail is provided with a hub on a fixed component fastened to the balance-cock and surrounded by and pressed by a regulator ring which may be adjusted around the hub and located at the same level as the control organ, this ring being provided with an arm carrying the regulator pin and key or balance-spring boot.

The attached drawing shows an embodiment of the device according to the invention in the form of an illustration in which:

FIG. 1 is a top view; and
FIG. 2 is a sectional view along line II—II of FIG. 1.

The drawing shows a balance-cock 1 of a watch movement, which is provided at the back end with three guiding pins 2 and with an opening 3 for accepting a tightening or fastening screw. The planche or plate of balance-cock 1 is provided with a circular hole 4 near the cock's thicker part, and with a second opening 5 at the front end where the bearing body 6 is mounted which will support the upper end of the balance staff. An annular groove 7 is stamped out in the thicker slice of the cock and coaxially with bearing-body 6 in order to accept the movable hair-spring stud support 8 of which the slit annular part compresses the inner flank of groove 7.

Regulator 9 is made up of two parts: a regulator tail 10 and a regulator ring 11. Tail 10 is a flat, stamped piece with an annular thickening at its front end constituting a hub 12. The inside of hub's opening is slightly like a frustrum and penetrates the upper part of bearing body 6, which is also slightly shaped like a frustrum. Hub 12 extending downwards from the flat part of tail 10, this flat part extends some distance above the cock's planche or plate. The regulator's annular part 11 also is stamped out as a plane plate with a radial arm supporting key or balance-spring boot 13 and pin 14 of the regulator. The open ring of component 11 compresses hub 12 of tail 10 so that by moving it with respect to tail 10, a coarse adjustment of regulator position is possible. However, any motion imparted to tail 10 entails that of annular component 11. (Tail 10 therefore is used to effect fine adjustment. To that end, it extends towards the cock's rear part and at its own back end is provided with a slit 15 opening rearwards and directed towards its rotation axis.) The tail is further provided with a cut-out opening laterally on one of its sides and bounded on the side of hub 12 by an edge 17 comprising an arc of a circle along which there are graduations 17a. The origin of this arc is at a point on the axis of slit 15 and near its bottom. When the regulator is in the normal position as shown in the drawing, this point coincides with the axis of the cock's opening 4. This is so because the connection between the balance-cock and the regulator-tail is achieved by means of a control organ 18 which is provided with a downwardly projecting pivoting peg 19 penetrating into opening 4, with a second upwardly pointing eccentric peg 20 shifted rearwards with respect to peg 19 and penetrating slit 15, and with a finger-piece 21 which is oriented towards the regulator axis according to the line formed by the axes of pegs 19 and 20. This finger thus extends in the cut-out area 16 and terminates opposite the arcuate edge 17 and graduations 17a. In the direction of height, it is located between the upper side of the cock's planche or plate and the inner side of tail 10, while being thicker in the cut-out area of the regulator tail.

Lastly it should be observed that the arcuate edge 17 of the regulator tail is bounded on one side by an edge or lip 22 and on the other by the remainder of the tail 10 that extends longitudinally towards the back end. These two parts of tail 10 are used to limit the displacements of control organ 18.

The device described offers the advantage of very simple construction since all its components may be cut out and stamped. It further allows swift and easy coarse adjustment by rotating the annular piece 11 with respect to tail 10, then fine adjustment by means of control finger 18. Further, it is of small or lesser thickness since the control finger 18 extends in the regulator's cut-out. Also, this cut-out allows access to control finger 18 by means of a tool and consequently fine adjustment may be effected mechanically. Because eccentric 20 is located behind pivot 19, graduation 17a tends to move oppositely to the tip of finger 18 during this adjustment, so that better indexing of this finger's position is possible.

Lastly, another factor permitting simplification of both manufacture and assembly consists in the freedom from any screw-requirement and in the fact of the device being properly held by the position of hub 12 on the frustrum-shaped side of component 6.

What is claimed is:

1. A fine-adjustment device for watch movement regulator assemblies, comprising: a balance cock; a regulator-tail; a control organ pivoting on said balance cock and having an eccentric cooperating with said regulator-tail, said control organ comprising a finger-piece extending toward the axis of said regulator assembly within a cut-out which is laterally open on one side of said regulator-tail; a hub provided on said regulator-tail located on a fixed component fastened to said balance cock said fixed component having an axis which defines the axis of said regulator assembly; and an adjustable regulator ring surrounding said hub and compressing said regulator-tail, said ring being located at the same level as said control organ, said ring having an arm supporting regulator pin and key or balance-spring boot.

2. A device according to claim 1, wherein said regulator-tail cut-out is limited on the side of the regulator axis by an arcuately shaped edge having graduated markings thereon and which is concave and coaxial with respect to a pivot of said control organ and located opposite the finger of said organ.

3. A device according to claim 1, wherein said regulator-tail is provided with an open slit at its rear within which is located the eccentric of said control organ.

4. A device according to dependent claim 3, wherein the axis of rotation of said control organ is located between the axis of said regulator assembly and said eccentric.

5. A device according to claim 1, wherein the finger of said control organ comprises a thin component near the eccentric, said component being located underneath the regulator-tail and the finger comprises a thick component beyond the thin one which is located within the regulator-tail cut-out and which is laterally accessible.

* * * * *